April 11, 1944.     S. H. BENJAMIN     2,346,144
SAFETY BLADE MAGAZINE
Filed June 14, 1941     3 Sheets-Sheet 1

INVENTOR.
Sidney H. Benjamin
BY
ATTORNEY

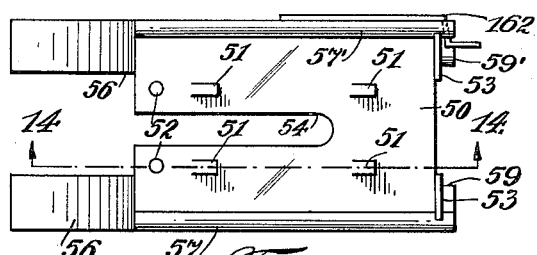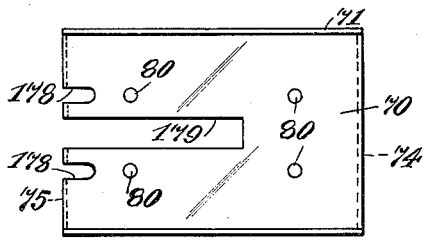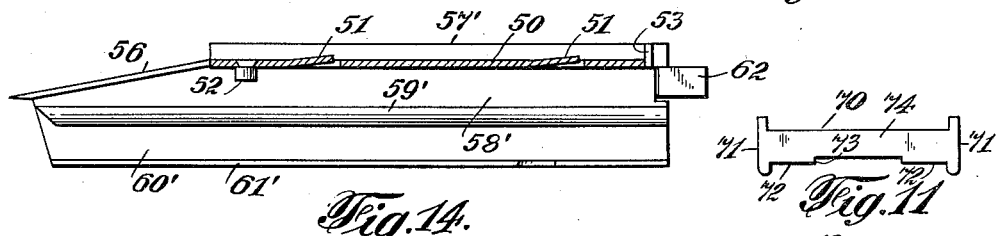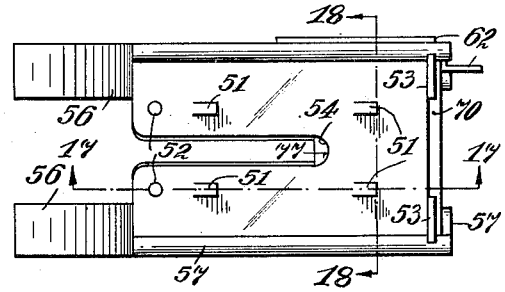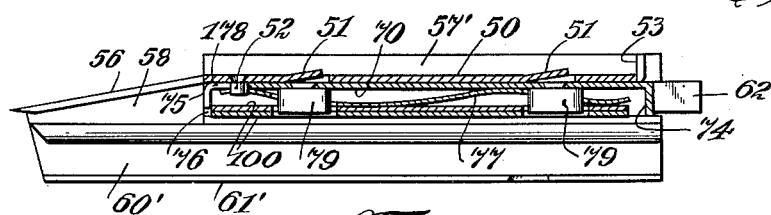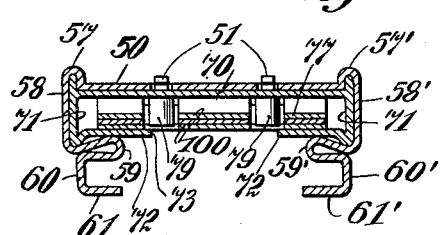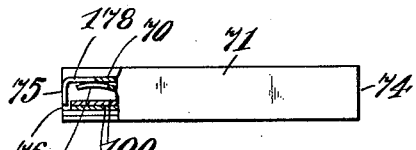

April 11, 1944.　　　S. H. BENJAMIN　　　2,346,144
SAFETY BLADE MAGAZINE
Filed June 14, 1941　　　3 Sheets-Sheet 3

INVENTOR.
Sidney H. Benjamin
BY
ATTORNEY

Patented Apr. 11, 1944

2,346,144

UNITED STATES PATENT OFFICE 2,346,144

SAFETY BLADE MAGAZINE

Sidney H. Benjamin, Milwaukee, Wis.

Application June 14, 1941, Serial No. 398,053

6 Claims. (Cl. 30—40)

My invention relates to blade magazines and refers particularly to blade magazines adapted to receive and removably retain safety blades.

The safety blade magazines of my invention are particularly adapted for the reception and removable retention of a plurality of stacked razor blades, said blade magazines being so constructed as to allow the ejection, or otherwise removal, of only the outermost blade of said stacked blades, the other blades being retained therein.

The safety blade magazines described in this application are particularly adapted for use with the blade magazine holders described in my pending United States Patent application, Serial Number 396,385, filed June 3, 1941.

The object of the devices of my invention is to allow of the removal of the outermost blade in a stack of blades within a blade magazine and to place said removed blade in a desired position upon an element of a razor head, said device may be, if desired, so constructed as to remove a positioned blade from an element of a razor head.

As the blade magazine must be in a predetermined position within a blade magazine holder in order that the ejecting means may operate to withdraw, or eject, a blade therefrom, it is evident that some means must be employed to so position the blade magazine with respect to the withdrawing or ejecting, means that the latter may properly operate.

As these safety blade magazines are removably carried by blade magazine holders, in order that they may operate with a razor head to withdraw a single blade from the stacked blade within the blade magazine, it is evident that such magazine holders must possess some stop means whereby the blade magazine when inserted within the holder will be properly positioned in order that the ejecting means may operate to withdraw such blade.

One of the obects of my invention is a safety razor blade magazine of such construction as to allow a portion of it to pass beyond such stop means, at the same time carrying means whereby the magazine will be positioned in operating position when a portion of it has thus passed said stop means.

It is evident that a blade magazine of such construction as not to allow a portion of it to pass the stop means, will not be positioned for the proper operation of the ejecting means to withdraw a blade therefrom.

The novelty and utility of the devices of my invention will be evident upon a consideration of my specification and its accompanying drawings.

In the accompanying drawings illustrating modified forms of the devices of my invention, similar parts are designated by similar numerals.

Figure 10 is a top plan view of a modified form of a blade magazine of my invention.

Figure 11 is a right hand elevation of Figure 10.

Figure 12 is a side view of the blade magazine partly broken away.

Figure 13 is a top plan view of a blade magazine holder adapted for use with the magazine shown in Figures 10, 11, and 12.

Figure 14 is an enlarged section through the line 14—14 of Figure 13.

Figure 15 is a right hand end view of Figure 13.

Figure 16 is a top plan view of the combined magazine holder and blade magazine.

Figure 17 is an enlarged section through the line 17—17 of Figure 16.

Figure 18 is a section through the line 18—18 of Figure 16.

Figure 1:
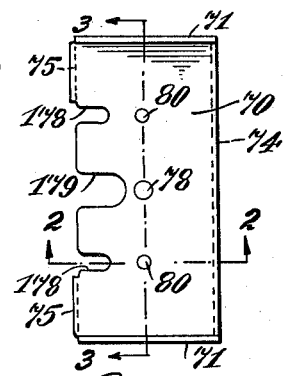
Figure 1 is a top plan view of one form of a blade magazine of my invention.
Figure 7:
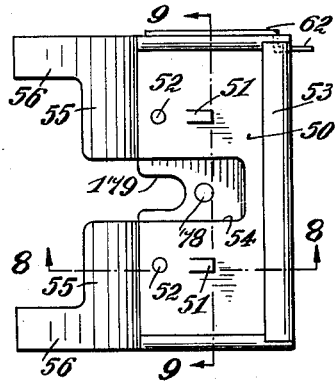
Figure 7 is a top plan view of the magazine holder with the blade magazine inserted therein.
Figure 3:
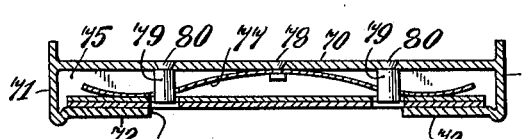
Figure 3 is a section taken through the line 3—3 of Figure 1.
Figure 2:
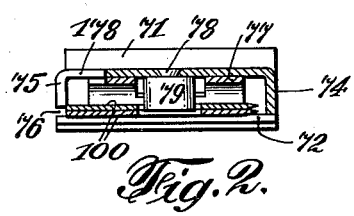
Figure 2 is a section taken through the line 2—2 of Figure 1.
Figure 9:
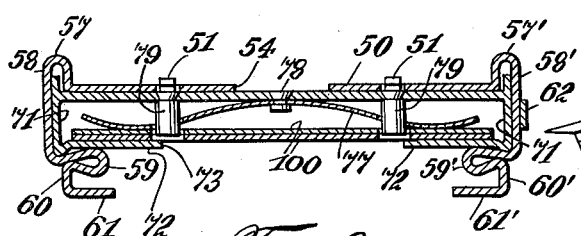
Figure 9 is a section through the line 9—9 of Figure 7.

The particular form of a blade magazine shown in Figures 1, 2 and 3 comprises a casing having a top face member 70, the two side face members 71, 71, the two spaced bottom face members 72, 72 forming the longitudinal opening, or recess, 73, and the end face members 74 and 75, the end face member 75 being extended downwardly to form the opening 76, through which the bottom blade 100 may be withdrawn, or ejected, while the remaining blades 100, 100 are retained within the magazine.

A plurality of blades 100, 100 are positioned within the magazine and are pressed downwardly by the spring 77, fastened to the top face member 70 by means of the rivet 78. The top face member 70 carries the two downwardly extended lugs 79, 79, fastened thereto by rivets 80, 80 and adapted to pass through an opening, or openings, in the razor blades 100, 100 and through openings in the spring 77. The top face member has forwardly positioned recesses 178, 178 and 179, the recess being adapted to receive a lug of a razor head.

Figure 4:
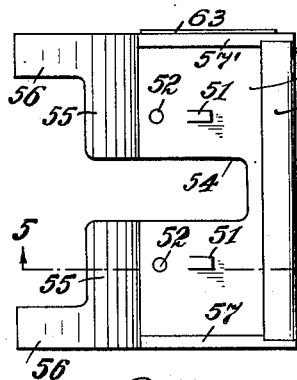
Figure 4 is a top plan view of one form of a blade magazine holder adapted for use with the device of Figures 1, 2, and 3.
Figures 5, 6:
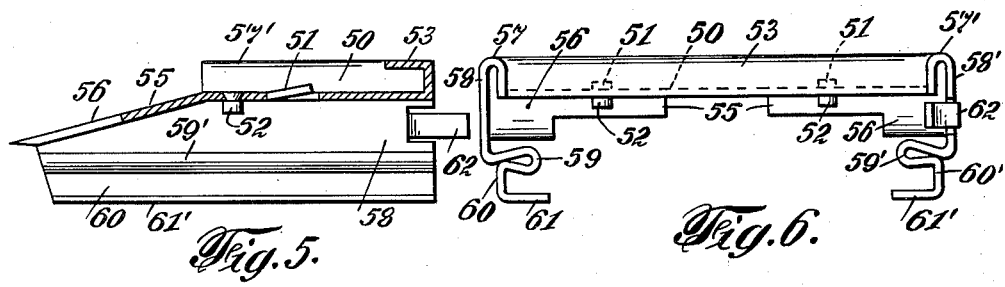
Figure 5 is a section through the line 5—5 of Figure 4.
Figure 6 is a rear end view of Figure 4.

The particular form of the blade magazine holder shown in Figures 4, 5 and 6, adapted for razors of the Gem type, above described, comprises the top face member 50 having the two upwardly extended cut-out blade engaging members 51, 51, and the inwardly extended stop pins 52, 52. These stops 52, 52, are so positioned that a blade magazine must extend inwardly beyond them, in order that the blade ejecting means may be operative.

The rearward end portion of the top face member 50 is extended upwardly forming the U-shaped member 53, and the forward end portion of the top face member 50 has a recess 54 and is inclined downwardly, forming a blade guide comprised of the two members 55, 55, and 56, 56, the forward end portions of the members 56, 56 being bevelled. The sides of the device are formed by the U-shaped members 57, 57', which is extended downwardly to form the members 58, 58', then inwardly forming the loop members 59, 59', thence downwardly forming the members 60, 60' and thence inwardly forming the two spaced bottom members 61, 61'. The number and position of stop pins 52, 52 and the number and positions of cut-outs 51, 51 may be varied if desired. The two spaced bottom face members 61, 61' may be extended toward each other forming a unitary bottom, in which case the forward portion of the bottom face member will have an inwardly directed recess. One of the side face members has a Z-shaped resilient retaining member 62, the central portion of which is normally positioned within the side face member, thus forming a blocking member therein, this blocking member being capable of removal from its normal position by means of its outwardly extended member 62'.

In order to withdraw a used blade it is necessary that some means be employed whereby the used blade may be removably attached to the magazine holder or to the blade magazine while the devices are in contact with the razor head and that the attaching means be of such construction as to remove the used blade from the razor head.

It is evident that a blade magazine without the recesses 178, 178 cannot be operatively employed with the described magazine holder, as the stops 52, 52 will prevent its being inserted far enough to properly position it for blade removal.

Figure 8:
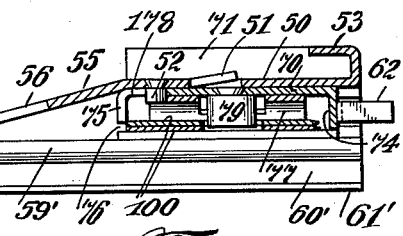
Figure 8 is a section through the line 8—8 of Figure 7.

In operation, the blade magazine is introduced into the holder through its rearward end and moved forwardly therein until the inner ends of the recesses 178, 178 of the magazine abut upon the stops 52, 52 of the magazine, the blades then being in position for withdrawal, or ejection, from the magazine for placement upon a razor head for shaving purposes. When the magazine is in this position, the inner portion of the Z-shaped retaining member 62 is in the position shown specifically in Figure 8, thus preventing the outward movement of the magazine.

To operate the thus combined magazine holder and blade magazine, the two outward extended arms 56, 56 of the blade guiding members 55, 55 are introduced between the guard of a razor head and a blade positioned thereon and moved inwardly, during which movement the positioned blade is removed from lugs positioning it on the guard and moves upwardly over the upper face of the blade guides 55, 55 and then across the upper face of the top 50 of the magazine holder, this movement continuing until the blade engaging members 51, 51 of the magazine holder enter openings in the blade. When the blade is in this position upon the magazine holder, the magazine holder and its blade magazine are withdrawn from contact with the razor head, thus withdrawing the formerly positioned blade from the razor head.

The device of my invention shown in Figures 10 to 18, inclusive, is adapted for use with the Gillette type of razors and is similar to that previously shown and described; similar parts being designated by similar numerals. This form of my device, however, varies slightly from that previously described in order to adapt it for the particular construction of the Gillette type of razor and blades, such variations, however, do not affect the co-ordination between the magazine holder and a blade magazine, nor do they affect the operation of these two assembled elements for the withdrawal of a positioned blade from a razor head, and, hence, a detailed description is not necessary for a clear understanding of their construction and application. It will be noted that the magazine holder of this construction has four blade engaging members 51, 51, instead of two as shown in the previously described device.

The modified form of my device shown in Figures 19, 20, 24, and 28 illustrate a blade magazine comprising the top member 216. Each side of the top member 216 is bent to form a loop 217, thence, downwardly forming the member 218, thence, inwardly forming the member 219, and thence downwardly forming the member 220. The blade magazine has the closed end 221 and the end 222, which is spaced from the side members 219, 219, forming an opening 223, the height of which is great enough to allow of the passage therethrough of the bottom member of a stack of razor blades 224, 224 therethrough, but preventing the passage therethrough of other blades of this stack of blades.

The forward end of the top member 216 has a cut-out 225, forming the opening 226 in the top member 216 and the opening 227 in the front end member 222.

Figure 21:
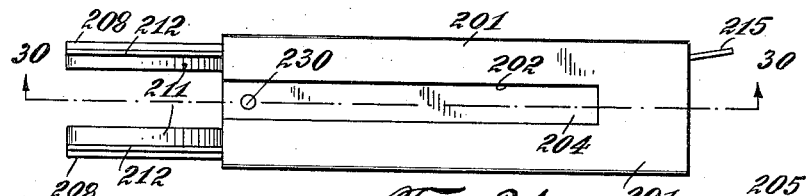
Figure 21 is a top plan view of a magazine holder adapted to operate with the magazine of Figures 19 and 20.
Figures 22, 23:
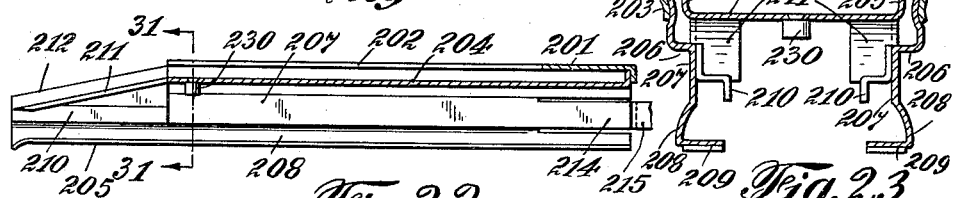
Figure 22 is a section through the line 30—30 of Figure 21.
Figure 23 is a section through the line 31—31 of Figure 22.

The modified form of my device shown in Figures 21, 22, and 23, which refers particularly to narrow razor blades, comprises the top member 201, having the longitudinal slot 202 and having the downwardly extended sides 203, 203. The above-described device acts as a cover for the magazine holder proper.

The magazine holder proper comprises the top member 204 carrying the downwardly extended stop member 230. Each side c the top member 204 is extended upwardly and then downwardly to form the loop member 205 which is then extended inwardly forming the member 206, then downwardly forming the member 207, then downwardly forming the curved member 208, then inwardly forming the member 209. Fixedly attached to the forward end of the inner face of each member 207 is a Z-shaped member having the downwardly extended member 210. The forward end member of the top 204 is inclined downwardly forming the two blade guide members 211, 211, each of which carries an upwardly extended flange member 212. One side member 207 carries a Z-shaped resilient retaining member 214, the central portion of which is normally within the magazine holder, but can be removed therefrom by movement of the extended member 215.

Figures 20, 25:
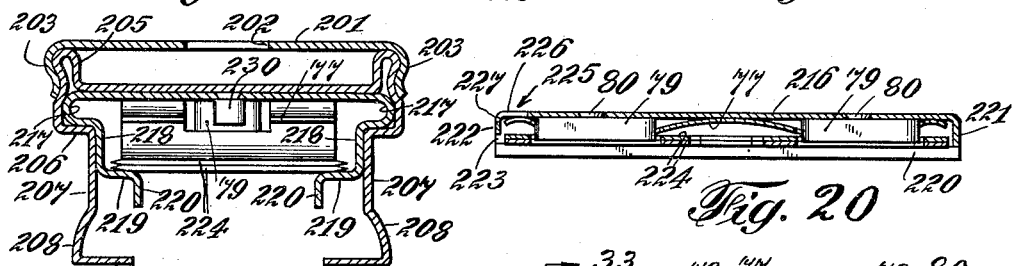
Figure 20 is a section through the line 28—28 of Figure 27.
Figure 25 is a section through the line 33—33 of Figure 24.
Figure 24:
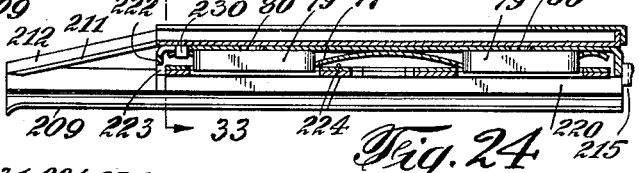
Figure 24 is a central longitudinal section of the combined described blade magazine within the described blade magazine holder.

Figures 24 and 25 show the described blade magazine inserted within the lescribed magazine holder, from which it will be noted that unless the blade magazine has an opening in its forward end of such construction as to allow the passage of the stop member 230 therethrough, the blade magazine cannot be inserted into the magazine holder to allow the operation of the blade ejecting means.

Figure 26:
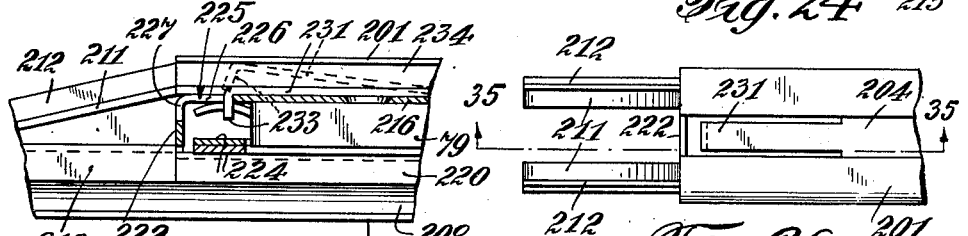
Figure 26 is a top plan view of a modified form of my device.
Figure 27:
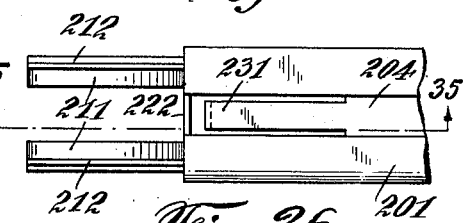
Figure 27 is a section through the line 35—35 of Figure 26.

In the modified form of a magazine holder and blade magazine shown in Figures 26 and 27, the stop member 230 of the previously described magazine holder is replaced by a struck-out tongue 231 cut-out of the top member 204 and bent downwardly at its forward end forming a stop member 233.

It will be noted that in this form of magazine holder, a blade magazine having a cut-out, such as 225, in its forward end will allow of the complete introduction of a blade holder for blade ejection, but if a blade magazine not having such forward cut-out is introduced into the magazine holder, the forward end of the blade magazine will abut upon the stop member 233, preventing its being introduced far enough to allow the blade ejecting means to operate. It will be further noted that if such a blade magazine is forcibly introduced beyond the stop member 233, it will force the stop member 233 to assume the position shown in broken lines, thus blocking the chamber 234 between the top member 201 and the top member 204, preventing the movement of a deposited blade into this chamber, and hence, the complete insertion of the magazine holder into the razor head. As the complete insertion of the magazine holder into the razor head is necessary for the deposition of a new blade, the device cannot be successfully employed.

All of the blade magazines thus described have a recess in the top member of the magazine so positioned as to allow the entrance therein of the stop member of the magazine holder, thus allowing the passage of a portion of the magazine beyond the stop member, in order that the magazine may be placed in position for the proper functioning of a blade ejecting means.

Figures 19, 28:
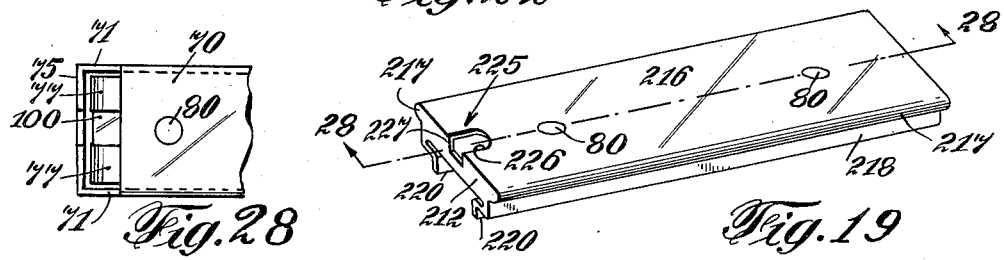
Figure 19 is a perspective plan view of a modified form of a device of my invention.
Figure 28 is a fragmentary top plan view of the delivery end of a modified form of the safety blade magazine of my invention.

Other means may be employed for this purpose, and one such additional means is shown in Figure 28, in which the top member 70 of the magazine, being shorter at its foreward end portion than the side members 71, 71, allows the magazine to pass beyond a stop member carried by a magazine holder, this reduced length of the top member functioning in the same manner as the top recesses previously described.

It will be noted that in all of the described forms of safety blade magazines, they are so constructed that a portion of them will pass beyond a stop member of a magazine holder with which they are employed, such magazine holders being of such construction that at least a portion of a magazine with its contained blades must pass such stop member in order to position the blades to co-operate with the ejecting means for the ejection, or withdrawal of a single blade from the magazine.

It will be noted that in this form of my device, as in the previously described devices, the magazine holder carries a stop member, so positioned that it is necessary for the blade magazine to have a recess in its forward portion in order to allow the placement of the magazine in a position to allow the operation of a blade ejector.

By "blade magazine" I means a magazine containing a plurality of stacked razor blades, so constructed as to allow of the ejection of a single blade at one time.

By "operative position" and similar words I mean that the blade magazine is so positioned within the magazine holder as to allow of the ejection of a single blade therefrom by the ejection means employed with the magazine holder.

By "recessed face member" I means a razor blade magazine casing, one face member of which is, at least in part, set back from the foreward end portion of blades carried thereby.

By "blade magazine holders" I mean devices adapted for the reception and withdrawal of magazines containing a razor blade, or a stack of razor blades, with means carried by said blade magazine holders, preventing the positioning of the blade magazines to allow the ejection, or withdrawal, of a blade therefrom by ejecting, or withdrawal, means unless at least a portion of said magazine with its contained blade or blades, is extended forewardly of said preventive means.

While I have shown and described the preferred form of my invention, it is obvious that modifications may be made in the structure disclosed without departing from the spirit of the invention defined in the following claims.

What I claim is:

1. A razor blade magazine adapted to receive a plurality of stacked razor blades comprising a casing having an elongated opening facilitating the emission of a razor blade from within said casing, resilient means within said casing constantly presenting the outermost blade of a stack of blades within said casing to said emission opening, means within said casing adapted to retain the remainder of said blades within said casing during the emission of said single blade, the top member of said casing having a forwardly positioned elongated recess, and at least one additional forwardly positioned elongated recess, the depth of each last mentioned additional recess being not greater than the depth of the first mentioned recess.

2. A razor blade magazine adapted to receive a plurality of stacked razor blades comprising a casing having an elongated opening facilitating the emission of a razor blade from within said casing, resilient means within said casing constantly presenting the outermost blade of a stack of blades within said casing to said emission opening, means within said casing adapted to retain the remainder of said blades within said casing during the emission of said single blade, the top member of said casing having a forwardly positioned elongated recess and two additional forwardly positioned elongated recesses, the depth of each last mentioned additional recess being not greater than the depth of the first mentioned recess.

3. A razor blade magazine adapted to receive a plurality of stacked razor blades comprising a casing having an elongated opening facilitating the emission of a razor blade from within said casing, resilient means within said casing constantly presenting the outermost blade of a stack of blades within said casing to said emission opening, means within said casing adapted to retain the remainder of said blades within said casing during the emission of said single blade, the top member of said casing having a forwardly positioned elongated recess and at least one additional forwardly positioned elongated recess, the depth of each last mentioned recess being not greater than the depth of the first mentioned recess and adapted to receive an extended blade positioning member carried by a blade magazine holder.

4. A razor blade magazine adapted to receive a plurality of stacked razor blades comprising a casing having an elongated opening facilitating the emission of a razor blade from within said casing, resilient means within said casing constantly presenting the outermost blade of a stack of blades within said casing to said emission opening, means within said casing adapted to retain the remainder of said blades within said casing during the emission of said single blade, the top member of said casing having a forwardly positioned elongated recess and at least two additional forwardly positioned elongated recesses, the depth of each last mentioned recess being not greater than the depth of the first mentioned recess and adapted to receive an extended blade positioning member carried by a blade magazine holder.

5. A razor blade magazine adapted to receive a plurality of stacked razor blades comprising a casing having an elongated opening facilitating the emission of a razor blade from within said casing, resilient means within said casing constantly presenting the outermost blade of a stack of blades within said casing to said emission opening, means within said casing adapted to retain the remainder of said blades within said casing during the emission of said single blade, the top member of said casing having a forwardly positioned elongated recess and at least one additional forwardly positioned elongated recess adapted to receive a stop pin of a magazine holder carrying said safety blade magazine, the depth of each last mentioned recess being less than the depth of the first mentioned recess.

6. A razor blade magazine adapted to receive a plurality of stacked razor blades comprising a casing having an elongated opening facilitating the emission of a razor blade from within said casing, resilient means within said casing constantly presenting the outermost blade of a stack of blades within said casing to said emission opening, means within said casing adapted to retain the remainder of said blades within said casing during the emission of said single blade, the top member of said casing having a forwardly positioned elongated recess, adapted to receive the blade positioning stud of a razor head, the top member having at least two additional forwardly positioned elongated recesses, adapted to receive a stop pin of a magazine holder carrying said safety blade magazine, the depth of each last mentioned recess being less than the depth of the first mentioned recess.

SIDNEY H. BENJAMIN.